Patented Dec. 6, 1938

2,139,068

UNITED STATES PATENT OFFICE 2,139,068

TRANSFER SHEET FOR DECORATING RUBBER

Pierre Marcel Bourdon, Paris, France, assignor to Michelin et Cie, Clermont-Ferrand, France, a corporation of France No Drawing. Application December 28, 1936, Serial No. 117,974. In France May 8, 1936

2 Claims. (Cl. 41—33)

The present invention relates to improvements in transfer sheets for decorating rubber articles.

It is known that various inscriptions or decorations may be applied to rubber articles by using a process similar to the decalcomania, the views used being printed reversely with printer's ink or some chemical ink and the transfer onto the rubber taking place under pressure in a heated mould. This process, which is employed for marking pneumatic tubes and tires, for example, does not lend itself to varied effects and the ink deposited on the rubber or the image produced by the action of the chemical ink is not resistant to mechanical action to any considerable extent.

Another known process consists in cutting a view, inscription or decoration into a thin sheet of specially prepared rubber. The prepared sheet is then placed on the object to be marked or decorated and imbedded in the rubber article by heating under pressure. It is possible to obtain by this method indelible inscriptions or decorations which are not destroyed readily by friction.

This latter process is very delicate and hence costly and so is not applicable except in case of a very simple decoration. The cutting of the view, or the inscription is practically a very delicate operation and it is also difficult to manipulate and correctly place the thin sheet of rubber so prepared.

An object of the present invention is to overcome the disadvantages found in the two processes explained by providing a new transfer sheet which assures by a simple means the imbedding in any manufactured rubber article of any inscriptions or decorations desired. Another object is to provide a sufficiently thick imbedded or inlaid design or inscription so that it will resist wear as long as the object upon which it is placed.

The invention comprises the following operations:

On some suitable support, for example, a paper sheet, is printed the reversed image of the inscription or the decoration which it is desired to apply to the rubber article. This image is printed by means of a special ink with a rubber base and with any color chosen from well known rubber dyes or pigments, and which contains also various substances designed to improve the quality of the vulcanized rubber.

This impression can be made, for example, by means of any printing machine which is capable of placing on paper a layer of ink of appropriate thickness, but any other means capable of coating a surface can be employed with equal success. Thus, a hand stencil might be used.

When the paper bearing the inscription or the decoration in relief is dry, it is placed on the rubber article which is to be marked or decorated after which the article is introduced into a mould or a vulcanizer. The inscription or decoration is placed then on the article and will be tightly or permanently bound to the article by reason of the pressure and heat of the vulcanizing and by reason of the fact that the two objects are made one by vulcanizing.

When the heating is stopped, it is only necessary to remove the paper serving as a transfer support. The inscription or decoration is then apparent on the article.

After impression of a design on the support and before transfer to the article, the support may be cut to give it any desired shape, as by using the idea of the decoration as a guide, or using some particular shape to adapt the process for application to an uneven surface.

The support employed to hold the special ink may be any substance capable of being printed upon, as thin sheets of metal, tissue, etc., and the support can be smooth or rough to give to the finished surface any desired appearance.

Preferably a support will be chosen which will not stick to the rubber during vulcanizing. This is true of some of the papers which are found now on the market. But if the support used does not fulfill this condition it can be prevented from sticking to the rubber during vulcanizing by coating it beforehand with a very dilute solution of cellulose acetate, of vinyl resin, of benzyl cellulose or any other substances having a similar action, dissolved in acetone, benzene, ethyl alcohol or a mixture of two or more of these substances. After natural or artificial drying, the treated support is printed or otherwise impressed with the special ink according to the procedure explained above.

The ink which is used for making the impression will be prepared, for example, from a concentrated solution of a mixture with a rubber base in a moderately volatile solvent as, for example, xylene or white spirit. The viscosity of the ink and its resistance to drying will be determined according to the type of printing machine which will be used and according to the thickness of the deposit which it is desired to obtain.

One can, for example, use for this purpose an ink having the following compositions:

| | Grams |
|---|---|
| Smoked rubber sheets | 70 |
| Zinc oxide | 36 |
| Magnesium carbonate | 15 |
| Titanium white | 25 |
| A green coloring "Vulcafixe 2 J" | 50 |
| Sulphur | 1.8 |
| An accelerator "Vulkacit P" | 2 |
| An accelerator "Captax" | 0.2 |
| Xylol | 800 |

The titanium white is a pigment containing a mixture of titanium oxide and barium sulphate.

The "Vulcafixe 2 J" is a green pigment. "Vulkacit P" is a commercial accelerator consisting of the penta-methylene-dithiocarbamate of piperadine. "Captax" is another commercial accelerator consisting of 2 mercapto-benzothiazole.

It will be seen that the process, according to the invention, permits the adaptation of all methods of impression to the decoration of any rubber articles because it will be easy to obtain, in a simple and economical manner, on the paper or any other suitable support, any inscription or decoration whether simple or complicated and whether in one or in several colors. Finally this process overcomes all the difficulties encountered in the working of previously known processes because the operator has only to handle simple sheets of printed paper.

The ink set out above is of the type which vulcanizes and sets very rapidly upon the application of heat. When such an ink is used the following happens: as soon as heat is applied to the mold containing the article to be decorated and the transfer with the decoration in contact with the article, the decoration is immediately vulcanized and becomes hard and undeformable long before the rubber of the article has softened; further action of heat and pressure has for result only to cause the flow of the softened rubber in intimate contact with the hard decoration, the contour of which cannot undergo any deformation and remains perfectly clean cut.

As a variation of the above process the following operation may be carried out:

The transfer support may be covered completely and uniformly, after properly preparing the support to prevent its sticking to the rubber during vulcanization. This covering will be of the ink with the rubber base as described. Then, after drying, the composite sheet may be cut to produce the decoration with which it is desired to ornament the rubber article and then the design is placed on the article and they are both inserted into the mould as indicated above in the case of a printed design.

This last recited process has some resemblance to the previously known process which consists in cutting the design into a thin sheet of rubber, for application to the article to be decorated. The variation according to the present invention has a great technical advantage that instead of handling a thin sheet of rubber in order to cut it and to transport it, it is only required to handle a support having a thickness and a rigidity as great as desired while having at the same time a thickness of rubberized substance as thin as is desired.

By employing a transfer support of sufficiently great thickness the surface of the object to be decorated is depressed by the thickness of the support and the desired decoration, or inscription, will be found at the bottom of the depression. This will assure a better protection of the inscription or design against mechanical injury and can also be used to attain certain artistic effects.

In another variation, the desired characters or designs may be applied directly to the rubber of the article to be ornamented by means of any machine or stencil adapted for such purpose. The same ink is employed as in the preceding instances and thereafter the impressed image will be vulcanized to the rubber article.

What is claimed is:

1. A transfer sheet for use in decorating rubber comprising a support, and a layer of an ink including rubber, zinc oxide, magnesium carbonate, titanium white, coloring matter, sulphur and an accelerator.

2. A transfer sheet for use in decorating rubber comprising a support, and a layer of an ink including, in 200 parts by weight, rubber 70, zinc oxide 36, magnesium carbonate 15, titanium white 25, coloring agent 50, sulphur 1.8, accelerator 2.2.

PIERRE MARCEL BOURDON.